J. A. ANTHONY.
AIR BRAKE RELEASE VALVE.
APPLICATION FILED SEPT. 21, 1909.
950,425.
Patented Feb. 22, 1910.
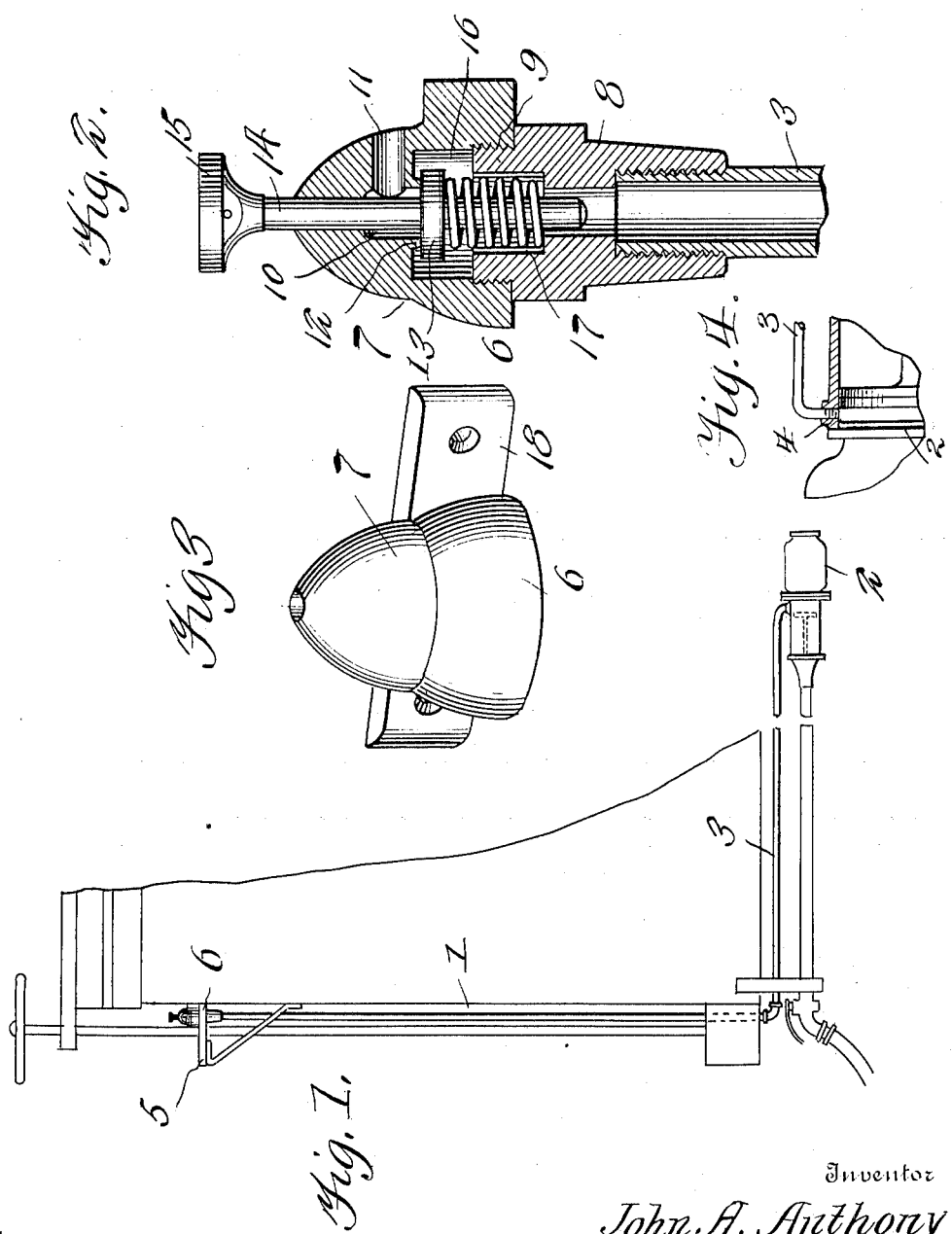
Witnesses
Hugh H. Ott
K. Allen
Inventor
John A. Anthony
By Victor J. Evans
Attorney

UNITED STATES PATENT OFFICE.

JOHN A. ANTHONY, OF CHARLESTON, SOUTH CAROLINA.

AIR-BRAKE-RELEASE VALVE.

950,425.  Specification of Letters Patent. Patented Feb. 22, 1910.

Application filed September 21, 1909. Serial No. 518,783.

*To all whom it may concern:*

Be it known that I, JOHN A. ANTHONY, a citizen of the United States, residing at Charleston, in the county of Charleston and State of South Carolina, have invented new and useful Improvements in Air-Brake-Release Valves, of which the following is a specification.

This invention appertains to releasing means for air brake systems in which a relief pipe connects with the brake cylinder in the rear of the piston and is provided with a relief valve to be conveniently operated by the brakeman from the top of the car or other convenient point so as to relieve the brake cylinder of pressure or to ascertain when the same contains air under pressure.

The present invention provides a novel form of valve to be applied to the relief pipe, said valve involving a peculiar construction and having a discharge opening so positioned as to prevent foreign matter entering the same and obstructing the workings of the valve.

The invention also has for its object to devise a valve embodying a sectional body, the upper section having an inner valve seat and a lateral discharge opening and having ears or a base whereby the valve may be attached to a convenient part of the car and thereby overcome the necessity for other fastening means, such as clips, strap irons, or the like and lock means to prevent separation of the parts of the body when coupled.

The improvement consists of the novel features, details of construction and combinations of parts which hereinafter will be more particularly set forth, illustrated, and finally claimed.

Referring to the drawing, forming a part of the specification, Figure 1 is a detail view of an end portion of a box car provided with a relief pipe for the brake cylinder embodying the invention. Fig. 2 is a sectional view of the relief valve. Fig. 3 is a detail view in perspective of the upper portion of the valve body. Fig. 4 is a sectional view of the brake cylinder, showing the manner of connecting the relief pipe thereto.

Corresponding and like parts are referred to in the following description, and indicated in all the views of the drawing, by the same reference characters.

The numeral 1 designates the front or end portion of a box car. The brake cylinder is indicated at 2, and 3 is the relief pipe connected to the brake cylinder in the rear of the piston, so as to relieve the cylinder of all pressure when the relief valve is opened. The manner of connecting the relief pipe to the brake cylinder is indicated most clearly in Fig. 4, the brake cylinder having a boss 4 for strength and to enable an extended screw thread connection of the relief pipe 3 being had therewith. The relief pipe 3 extends beneath the bottom of the car, thence upward along the front or end and terminates about in the plane of a platform 5. The relief valve 6 is connected to the upper end of the relief pipe 3 and is conveniently positioned to receive the pressure of the foot of the brakeman or other person when it is required to relieve the brake cylinder of pressure.

The relief valve is of sectional formation and comprises an upper section or member 7 and a lower section or member 8, the two sections being connected by means of a screw thread joint 9, one of the sections being reduced and having the reduced portion threaded and the other section having the opening therein of a size and threaded to receive the threaded portion of the section 8. The upper section 7 is formed with a chamber 10, from which an opening 11 extends laterally through the rear side of the section 7 so as to be protected by the end of the car and thereby prevent any foreign matter entering the valve through the vent or discharge opening 11. A flange 12 projects from the chamber 10 in line therewith and constitutes a seat for a valve 13, which is carried by a stem 14 and is adapted to close upward against the seat 12. A button 15 is provided at the upper end of the stem 14 to receive the pressure of the foot when it is required to open the valve. The valve 13 is adapted to operate in a space 16 formed in the lower portion of the section 7 and of larger diameter than the chamber 10. A helical spring 17 mounted upon the lower portion of the stem 14 exerts an upward pressure on the valve 13 to normally hold the same seated. The section or member 8 is formed with a central opening, which is contracted intermediate of its ends to receive the lower end of the stem 14, the upper end of the opening receiving the helical spring 17. The upper section or member 7 is formed with oppositely disposed ears 18 forming a base or attaching means for securing the valve to the car.

The ears or base 18 are apertured to receive fastenings, such as bolts or lag screws, whereby the valve is attached to the car. It will be understood that when the valve is in position the upper member or section is prevented from turning upon the lower member or section 8 by reason of the attaching ears or base 18.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In an air brake system and in combination with the brake cylinder and relief valve connected thereto in the rear of the piston, a valve fitted to said relief pipe and of sectional formation, the two sections being connected by means of a screw thread joint, the upper section having a chamber and a laterally extending discharge opening leading from said chamber and having a rim forming a valve seat, a valve arranged in the space formed between said sections and adapted to close upward against said seat, a stem operating within the sections and extending above the upper section and terminating in a button forming the pressure piece, and a spring located within the valve casing and exerting an upward pressure upon the valve to hold the same seated.

2. In an air brake system comprising a brake cylinder and a relief valve connected thereto at a point in the rear of the piston, a valve comprising a casing of sectional formation and having the sections connected by means of a screw thread joint, the upper section having a chamber, a discharge opening leading laterally from the chamber and opening through the rear side of the section, a pendent rim forming a valve seat and having oppositely disposed ears forming a base adapted to receive fastenings for securing the valve in position, the lower section having an opening therethrough which is contracted intermediate of its ends, a valve arranged to operate in the space formed between the sections of the casing, a stem carrying the valve and operating through an opening formed in the upper section, and a spring mounted upon said stem and fitting within the upper end of the opening formed in the lower section and exerting an upward pressure on the valve.

In testimony whereof I affix my signature in presence of two witnesses.

JOHN A. ANTHONY.

Witnesses:
I. J. ZEIGLER,
GEO. H. FOLK.